United States Patent

[11] 3,602,606

| [72] | Inventor | John Joseph Rigby<br>London, England |
|---|---|---|
| [21] | Appl. No. | 852,680 |
| [22] | Filed | Aug. 25, 1969 |
| [45] | Patented | Aug. 31, 1971 |
| [73] | Assignee | Robert Rigby Limited<br>London, England |
| [32] | Priority | Aug. 27, 1968 |
| [33] | | Great Britain |
| [31] | | 40964/68 |

[54] FILM SYNCHRONIZERS
7 Claims, 4 Drawing Figs.

[52] U.S. Cl. .................................................. 352/13,
352/129
[51] Int. Cl. .................................................. G03b 31/04
[50] Field of Search .................................................. 352/13,
129, 12, 21, 22, 31, 5, 6

[56]  References Cited
UNITED STATES PATENTS

| 2,813,453 | 11/1957 | Browder | 352/13 |
| 3,002,703 | 10/1961 | Hinchman | 352/129 UX |
| 3,427,099 | 2/1969 | Marsden | 352/13 X |

*Primary Examiner*—Louis R. Prince
*Assistant Examiner*—Joseph W. Roskos
*Attorney*—Dowell & Dowell

ABSTRACT: A synchronizer for sound and picture editing of motion pictures, which is provided with additional sprocket wheels which are spaced apart to allow an animated picture viewer to be interposed between the additional sprocket wheels level with the pickup positions or the synchronizer. A positive nonslip drive is provided between the synchronizer and the additional sprocket wheels to move the film past the viewing station of the viewer at the same rate as the sound track is drawn past the pickups on the synchronizer either backwards or forwards without loss of synchronism.

FILM SYNCHRONIZERS

This invention relates to apparatus for editing cinematographic film and in particular to apparatus for synchronizing the picture with a sound track or sound tracks.

A problem has long existed in the cine film industry of synchronizing the picture with the sound track. Hitherto, this has been accomplished by using a multitrack film synchronizer, in which one of the tracks of the synchronizer (normally, the one furthest from the operator) is used for the picture, and the other or others for the sound track(s). A viewer is then placed a known number of frames in front (i.e. upstream) of the synchronizer and marks on the film are aligned with those on the sound track(s). However, as the viewer is not in line or 'level' with the axis of the synchronizer, errors can arise if the viewer becomes out of phase with the synchronizer, and, in addition, the film cannot easily be wound back for rechecking.

In a synchronizer of the type described in accordance with the invention there are two additional film driving sprockets which are mutually spaced apart by a sufficient distance to allow an animated picture viewer to be interposed so that its viewing station is in line or 'level' with the normal sound pickup positions on the synchronizer, a positive, nonslip drive between the main spindle and the additional sprockets being arranged to rotate the latter so that their circumferential velocity is the same as that of the sprockets wheels.

The invention extends to coupling apparatus which can be fitted to a conventional synchronizer to modify it in accordance with the invention. The coupling apparatus comprises two additional sprocket wheels arranged to be driven positively by a driving wheel adapted for attachment to the spindle of a synchronizer, the additional sprocket wheels being arranged so that an animated picture viewer can be placed in between the two additional sprockets to enable the viewer to be used 'level' with the synchronizer.

By using the synchronizer in accordance with the invention level with the viewer there is no lag between the picture and the sound and the sound tracks and/or film can be wound backwards and forwards at will, without losing synchronism between the various tracks.

The synchronizer may conveniently be mounted on a base having a fixture for locating an animated picture viewer in position when required. This allows the viewer to be used separately for picture editing alone.

As it is essential that there should be no possibility of slip between the spindle of the synchronizer and the film passing over the additional sprocket wheels a toothed rubber or nylon belt may be used as the positive driving means between the sprocket wheels and the main spindle. In order to reduce the overall size of the apparatus, the pulley wheels which cooperate with the belt are arranged to step-up the speed of rotation of the sprocket wheels in order to allow a corresponding reduction in their diameter.

A light spring bias can be arranged on one of the sprocket wheels to tension the film across the viewer in order to compensate for stretching or shrinkage of the film.

It will be appreciated that the invention can be applied to synchronizers and viewers for any film width, for example, from 8 mm. to 70 mm. width film.

The invention will now be further described by way of example with reference to the accompanying drawings in which.

Figure 1:
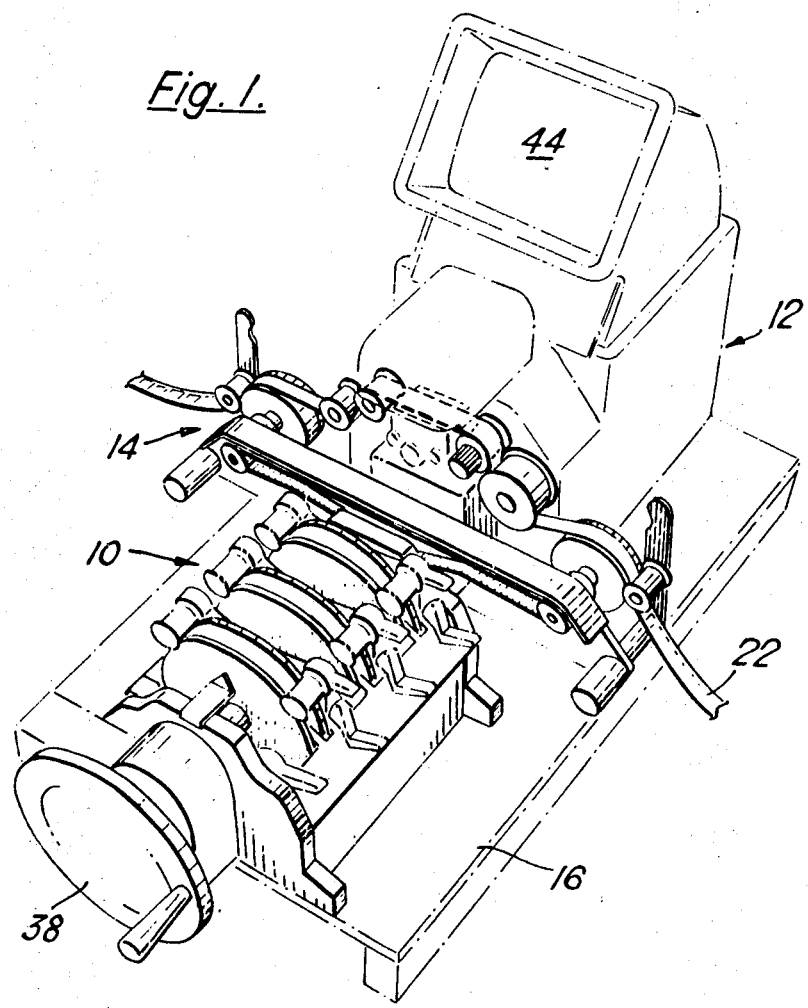
FIG. 1 is a perspective view of a syncrhonizer in accordance with the invention with an animated picture viewer.
Figure 2:
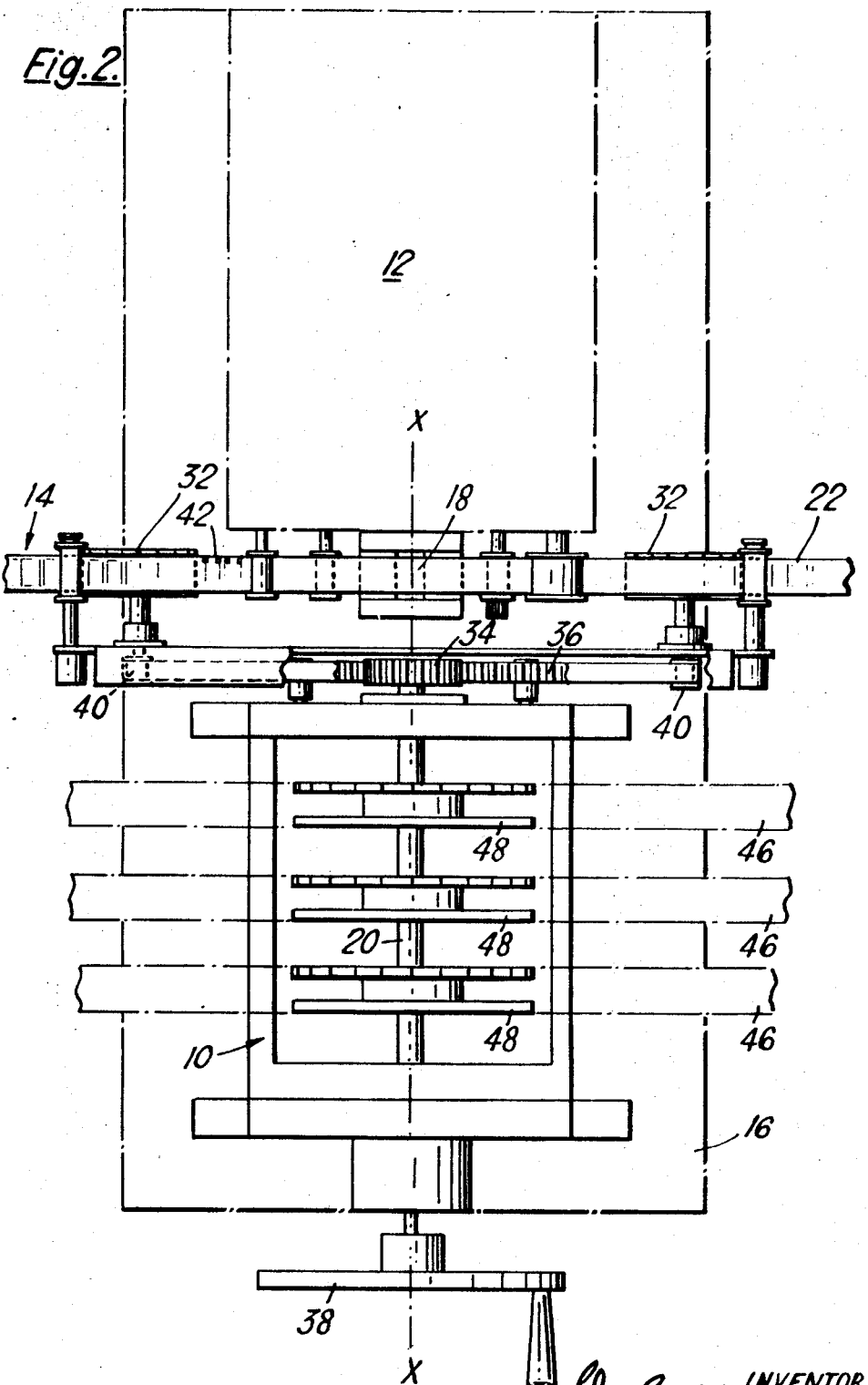
FIG. 2 is a diagrammatic plan of a syncrhonizer shown in FIG. 1.
Figure 3:
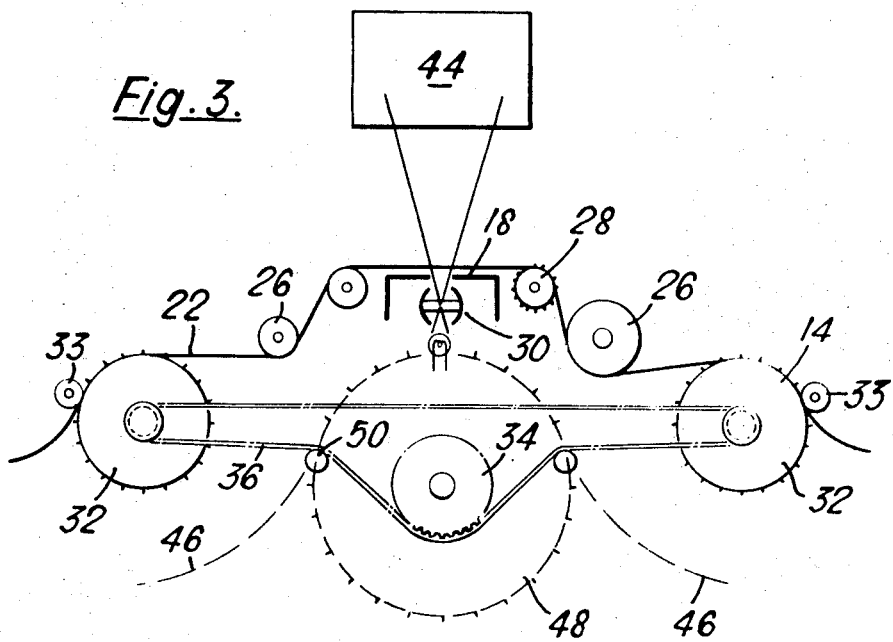
FIG. 3 is a diagrammatic and elevation showing the drive to the two additional sprocket wheels.

In FIGS. 1 to 3 a conventional synchronizer 10 (such as our own 'Premier' ) (Registered Trade Mark) synchronizer) is shown operatively coupled to a conventional animated picture viewer 12 (such as a 'Muray' (Trade Mark) viewer) by means of coupling apparatus 14. The synchronizer is mounted on a base 16 so that the illuminating station 18 of the viewer 12 is directly in line (or 'level') with the main spindle 20 of the synchronizer 10. As it may be desired to use the viewer 12 independently of the sound editor, the base 16 is merely formed with location means for the viewer 12.

In use, a length of film 22 is laid over the illuminating station 18 of the viewer 12 and threaded through the wheels 26 of the viewer to engage a sprocket wheel 28 which drives a blacking-out prism shown diagrammatically at 30 in the viewer. The film 22 is also engaged at either side of the viewer over two additional sprocket wheels 32 which are driven by a driving wheel 34 attached to the main spindle 20 of the synchronizer 10 via a toothed rubber belt 36.

Rotation of the spindle 20 of the synchronizer by means of a turning handle 38 causes the driving wheel 34 to drive the belt 36 thus turning two toothed wheels 40 mounted on the shafts of the sprocket wheels 32 respectively. The sprocket wheels 32, by virtue of their engagement with the perforations 42 of the film 22, move the film over the illuminating station 18 and turn the prism 30 of the viewer to produce an animated effect on the screen 44.

In use, in order to obtain correct synchronism, a mark on the film is placed on the 'level' line and then one or more sound tracks 46 are placed on the sprocket wheels 48 of the synchronizer with corresponding marks on the 'level' line and then clamped into engagement with the wheels 48. Sound editing can then be carried out by moving the film back and forth until the sound track matches the picture.

In order to reduce the diameter of the sprocket wheels 32 to make the coupling apparatus 14 more compact, the diameter of the driving wheel 34 is double that of the two driven wheels 40 connected to the additional sprocket wheels 32. A spring biassed belt tensioner 50 is provided to remove any chance of the belt slipping which would cause the sprocket wheels 32 to lose synchronism with the sprocket wheels 48 of the synchronizer.

Figure 4:
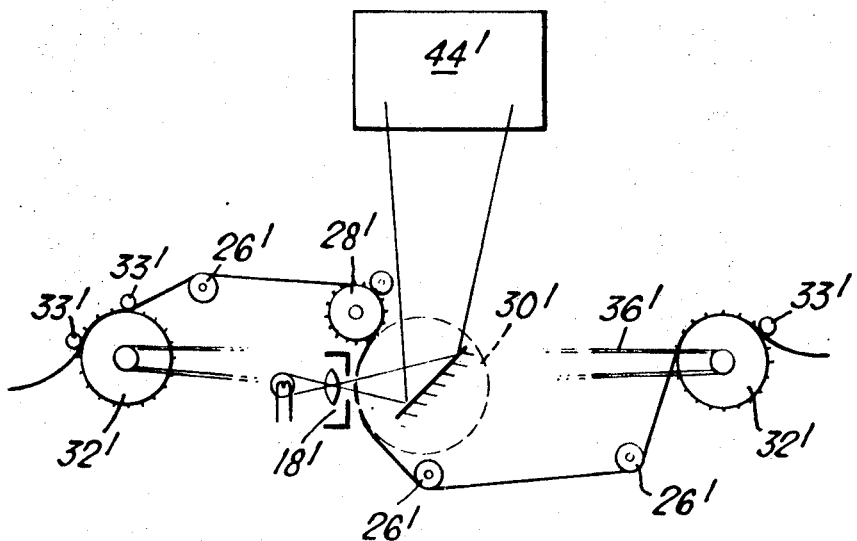
FIG. 4 shows how the invention can be applied to a different animated picture viewer.

FIG. 4 shows how the invention can be applied to an animated picture viewer of another kind which is normally used with 35 mm. and 70 mm. film. As the invention is not concerned with the optical arrangements of the viewer these have been shown purely diagrammatically and are unimportant in the functioning of the film drive by means of the additional sprocket wheels 32'. In this embodiment it may be necessary to space the additional sprocket wheels further apart to allow for the greater size of the viewer occasioned by the larger picture size for which it is intended but the positive drive from the main spindle 20 by means of the toothed belt is otherwise uneffected. The film is fed over the guide wheels 52' and engaged with a sprocket wheel 28' on the viewer which drives the blacking out device 30'.

In a synchronizer in accordance with the invention sound editing to take place in 'level' synchronism with the film picture, and in addition the film, and sound track(s) can be wound back and forth at will without danger of losing synchronism or any relative slip occuring between the several tracks being compared. A counter (not shown) is connected to the main spindle to indicate the number of each frame to assist positioning the various tracks.

It will be appreciated that the synchronizer can very easily be motorized if it is desired that it should be used as a sound/visual edition.

I claim:

1. In a cine film synchronizer comprising a number of sprocket wheels a main spindle to which said sprocket wheels are concentrically fixed, means for rotating said sprocket wheels together and means for holding a strip of perforated cine film or sound recording tape in driving engagement with each sprocket wheel, the improvement comprising two additional sprocket wheels arranged in a common plane parallel to that of the other sprocket wheels but spaced axially from them, the two additional sprocket-wheels being spaced apart to allow an animated picture viewer to be interposed between the two additional sprocket wheels; with its illuminating station in line with the main spindle, drive means being provided at one end of the spindle which is operatively connected to both of the additional sprockets to effect a positive drive which enables them to move a strip of cine film past the viewer at the same speed as the sound recording tape is moved past the synchronizer.

2. A synchronizer as claimed in claim 1 in which the drive means comprise a toothed belt which engages with a corresponding toothed driving wheel on the main spindle and on the additional sprockets.

3. A synchronizer as claimed in claim 1 in which the additional sprockets are smaller than those on the synchronizer, a corresponding speed step-up being provided in the drive means.

4. A synchronizer as claimed in claim 1 in which a spring tensioner is fitted to one of the additional sprockets and is effective to tension the film between the two said additional sprockets.

5. Coupling apparatus for connecting to a synchronizer having a number of sprocket wheels relatively fixed to a common spindle, the apparatus comprising two additional sprocket wheels which are spaced apart to allow an animated picture viewer to be interposed between the additional sprockets, drive means being provided which is adapted to be fitted to the main spindle for effecting a positive drive between the main spindle and the two additional sprocket wheels.

6. Apparatus as claimed in claim 5 in which the positive drive means comprises a toothed belt engaging with a toothed wheel adapted to be mounted on the main spindle and corresponding toothed wheels connected to the additional sprockets.

7. Apparatus as claimed in claim 5 in which a spring tensioner is fitted to one of the two additional sprockets.